United States Patent
Shimizu et al.

(10) Patent No.: US 7,994,979 B2
(45) Date of Patent: Aug. 9, 2011

(54) ANTENNA POSITIONING METHOD AND ANTENNA MOUNTING DEVICE FOR COMMUNICATION DEVICE, AND ANTENNA DEVICE

(75) Inventors: Masahiko Shimizu, Kawasaki (JP); Koji Matsuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 5 days.

(21) Appl. No.: 12/552,184

(22) Filed: Sep. 1, 2009

(65) Prior Publication Data

US 2010/0045529 A1 Feb. 25, 2010

Related U.S. Application Data

(63) Continuation of application No. PCT/JP2007/055384, filed on Mar. 16, 2007.

(51) Int. Cl.
*H01Q 3/00* (2006.01)
(52) U.S. Cl. ....................................................... 342/360
(58) Field of Classification Search ................... 342/360
See application file for complete search history.

(56) References Cited

U.S. PATENT DOCUMENTS

| 4,538,153 A | 8/1985 | Taga |
| 2003/0058171 A1 | 3/2003 | Umehara et al. |
| 2005/0266902 A1 | 12/2005 | Khatri et al. |
| 2006/0093080 A1* | 5/2006 | Linnartz .................. 375/347 |
| 2006/0097919 A1 | 5/2006 | Puckey et al. |
| 2008/0272976 A1* | 11/2008 | Kitamori et al. ............ 343/793 |

FOREIGN PATENT DOCUMENTS

| JP | 6312598 Y2 | 4/1988 |
| JP | 63106208 | 7/1988 |
| JP | 7143102 | 6/1995 |
| JP | 8265237 | 10/1996 |
| JP | 3280181 | 2/2002 |
| JP | 3370621 | 11/2002 |
| JP | 2003101340 | 4/2003 |
| JP | 2006203648 | 8/2006 |
| WO | 2004070874 | 8/2004 |
| WO | 2006077683 | 7/2006 |

OTHER PUBLICATIONS

International Search Report dated Jul. 3, 2007.

* cited by examiner

*Primary Examiner* — Thomas H Tarcza
*Assistant Examiner* — Harry Liu
(74) *Attorney, Agent, or Firm* — Murphy & King, P.C.

(57) ABSTRACT

In an antenna positioning method for a communication device that performs communication using a plurality of antennas positioned on a straight line, the method has a first step of measuring radiation pattern characteristics of each antenna, a second step of detecting a direction in which fluctuation of the radiation pattern characteristics of each antenna is large, and a third step of positioning each antenna in the communication device so that the direction in which the characteristic fluctuation is large matches the straight line direction.

12 Claims, 12 Drawing Sheets

(A)

(B)

(A)

(B)

(a)

(b)

ANTENNA POSITIONING METHOD AND ANTENNA MOUNTING DEVICE FOR COMMUNICATION DEVICE, AND ANTENNA DEVICE

CROSS REFERENCE TO RELATED APPLICATION

This application is a continuation of PCT application of PCT/JP2007/055384, which was filed on Mar. 16, 2007.

BACKGROUND OF THE INVENTION

The present invention relates to an antenna positioning method and an antenna mounting device for a communication device, and an antenna device.

Communication devices having a transmission diversity functions, receive diversity functions and MIMO (Multiple Input Multiple Output) communication functions, for performing communication using a plurality of antennas, are available. FIG. 11 is a diagram depicting a receive diversity, showing a space diversity configuration comprised of one transmission antenna ATt and two receive antennas $ATr_0$ and $ATr_1$. If the channel response characteristics between the transmission antenna ATt and each of the two receive antennas $ATr_0$ and $ATr_1$ are $h_0$ and $h_1$, noise between the transmission antenna ATt and each of the receive antennas $ATr_0$ and $ATr_1$ are $n_0$ and $n_1$, the transmission signal is $x_0$ and the receive signals of each of the receive antennas $ATr_0$ and $ATr_1$ are $r_0$ and $r_1$, then the following expressions are established.

$$r_0 = h_0 x_0 + n_0 \tag{1a}$$

$$r_1 = h_1 x_0 + n_1 \tag{1b}$$

FIG. 12 is a diagram depicting a maximum ratio combination, where the channel estimation units $1a_0$ and $1a_1$ in branches #0 and #1 (receive antennas $ATr_0$ and $ATr_1$) estimate the channel response characteristics $h_0$ and $h_1$ in the branches #0 and #1 and output the complex conjugate $h_0^*$ and $h_1^*$ of the channel response characteristics respectively, and channel compensation units $1b_0$ and $1b_1$ multiply the receive signals $r_0$ and $r_1$ by $h_0^*$ and $h_1^*$ respectively, and output $$s_0 = h_0^* r_0 \tag{2a}$$

$$s_0 = h_1^* r_1 \tag{2b}$$

or output the following respectively.

$$s_0 = |h_0|^2 x_0 + h_0^* n_0 \tag{2a}'$$

$$s_0 = |h_1|^2 x_0 + h_1^* n_1 \tag{2b}'$$

A space diversity combining unit $1c$ combines the output of the channel compensation unit $1b_0$ and $1b_1$ of each branch, and inputs the following combined signal to a demodulation unit $1d$.

$$s_0 + s_1 = (|h_0|^2 + |h_1|^2) x_0 + h_0^* n_0 + h_1^* n_1 \tag{2c}$$

In the maximum ratio combining method, $$(|h_0|^2 + |h_1|^2)$$

becomes a diversity gain.

In such a communication method using a plurality of antennas, it is necessary to decrease correlation, ideally to none, between the antenna receive signals. In FIG. 11, for example, if the correlation of the receive signals between the receive antennas $ATr_0$ and $ATr_1$ is 1, the receive state becomes worse when the channel response $h_0$ ($=h_1$) becomes worse, which makes diversity reception meaningless. But if the correlation is 0, then even if one channel response $h_0$ becomes worse, the other channel response $h_1$ does not become worse, and a good receive state can be maintained.

In a case of a communication device which can place a sufficient distance between antennas, the phase characteristics of the receive signal of each antenna change because of the distance difference, and correlation of the receive signals decreases. But in a case of a communication device of which antenna mounting positions are limited, such as a portable telephone, the distance between antennas is not sufficient, and correlation between the antenna receive signals becomes high, and as a result, the diversity function cannot be exerted as much as the case of no correlation, and the radio characteristics, including the error rate, deteriorate.

A conventional technology on radiation characteristics of an antenna is directional diversity that increases radiation characteristics of an antenna in a direction at which the radiation characteristics of another antenna is low, so that the radiation characteristics of the antennas compensate each other (Japanese Patent Application Laid-Open No. H7-143102), which can decrease correlation. In other words, according to this prior art, the radiation patterns of the two antennas are designed so as to be like petals in a conjugate relationship, as shown in (a) and (b) of FIG. 13, and one having a greater direct wave or indirect wave is selected.

However it is difficult to design antennas which have the radiation patterns in FIG. 13. Also the prior art does not fully consider the relationship of the radio incoming direction or the radio radiation direction and the antenna positions, and therefore the radiation pattern of each antenna is not always used efficiently.

SUMMARY OF THE INVENTION

In a certain aspect, it is an object of the present invention to decrease correlation between antennas, regardless the radio incoming direction or radio radiation direction.

In a certain aspect, it is another object of the present invention to decrease correlation between the antenna receive signals even if radio waves come from the direction of a straight line connecting at least two antenna positions.

Antenna Positioning Method

A first aspect of the present invention is an antenna positioning method for a communication device that performs communication using a plurality of antennas positioned on a straight line, having: a first step of measuring radiation pattern characteristics of each antenna; a second step of detecting a direction in which fluctuation of the radiation pattern characteristics of each antenna is large; and a third step of positioning each antenna in the communication device so that the direction in which the characteristic fluctuation is large coincides with the straight line direction.

The second step has a step of calculating a dispersion of the radiation pattern characteristics in a predetermined angle range, for the entire circumference, and a step of deciding a center direction of the angle range in which the calculated dispersion is maximum, as the direction in which the characteristic fluctuation is large.

The second step has a step of calculating a total of a dispersion of the radiation pattern characteristics in a predetermined first angle range and a dispersion of the radiation pattern characteristics in a second angle range which is shifted from the first angle range by 180°, for the entire circumference, and a step of deciding a center direction of the first angle range in which the calculated total is maximum, as the direction in which the characteristic fluctuation is large.

The second step has a step of calculating the correlation of the radiation pattern characteristics of a first antenna in a first angle range and radiation pattern characteristics of a second antenna in a second angle range, while changing a combination of the first angle range and second angle range, and a step of determining a combination of the first angle range and second angle range of which correlation is minimum, and judging a center direction of the first angle range as the direction in which the characteristic fluctuation of the first antenna is large, and judging a center direction of the second angle range as the direction in which the characteristic fluctuation of the second antenna is large.

The second step has a step of calculating the correlation of the radiation pattern characteristics of a first antenna in a first angle range and an angle range shifted from the first angle range by 180° and the radiation pattern characteristics of a second antenna in a second angle range and an angle range shifted from the second angle range by 180°, while changing a combination of the first angle range and second angle range, and a step of determining a combination of the first angle range and second angle range of which correlation is minimum, and judging a center direction of the first angle range as the direction in which the characteristic fluctuation of the first antenna is large, and judging a center direction of the second angle range as the direction in which the characteristic fluctuation of the second antenna is large.

Antenna Mounting Device

A second aspect of the present invention is an antenna mounting device for a communication device that performs communication using a plurality of antennas positioned on a straight line, having: a radiation pattern characteristic measurement unit that measures the radiation pattern characteristics of each antenna; a characteristic fluctuation detection unit that detects a direction in which fluctuation of the radiation pattern characteristics of each antenna is large; and an antenna positioning unit that positions each antenna in the communication device so that the direction in which characteristic fluctuation is large coincides with the straight line direction.

The characteristic fluctuation detection unit calculates a dispersion of the radiation pattern characteristics in a predetermined angle range for an entire circumference for each antenna, and decides a center direction of the angle range in which the calculated dispersion is maximum, as the direction in which the characteristic fluctuation is large.

The characteristic fluctuation detection unit calculates a total of a dispersion of the radiation pattern characteristics in a predetermined first angle range and a dispersion of the radiation pattern characteristics in a second angle range which is shifted from the first angle range by 180°, for the entire circumference for each antenna, and decides a center direction of the first angle range in which the calculated total is maximum, as the direction in which the characteristic fluctuation is large.

The characteristic fluctuation detection unit calculates the correlation of the radiation pattern characteristics of a first antenna in a first angle range and the radiation pattern characteristics of a second antenna in a second angle range, while changing a combination of the first angle range and second angle range, determines a combination of the first angle range and second angle range of which correlation is minimum, and judges a center direction of the first angle range as the direction in which the characteristic fluctuation of the first antenna is large and judges a center direction of the second angle range as the direction in which the characteristic fluctuation of the second antenna is large.

The characteristic fluctuation detection unit calculates the correlation of the radiation pattern characteristics of a first antenna in a first angle range and an angle range shifted from the first angle range by 180° and the radiation pattern characteristics of a second antenna in a second angle range and an angle range shifted from the second angle range by 180°, while changing a combination of the first angle range and second angle range, determines a combination of the first angle range and the second angle range of which correlation is minimum, and judges a center direction of the first angle range as the direction in which the characteristic fluctuation of the first antenna is large, and judges a center direction of the second angle range as the direction in which the characteristic fluctuation of the second antenna is large.

Antenna Device

A third aspect of the present invention is an antenna device in which a plurality of antennas, including a first antenna and a second antenna, are positioned on a straight line. In this antenna device, the first antenna is positioned so that radiation pattern characteristics of the first antenna at a portion crossing with the straight line has a larger change than a change of the radiation pattern characteristics of the first antenna at a portion crossing with a line which passes through the center of the first antenna and is perpendicular to the straight line. The second antenna is positioned so that radiation pattern characteristics of the second antenna at a portion crossing with the straight line has a larger change than a change of the radiation pattern characteristics of the second antenna at a portion crossing with a line which passes through the center of the second antenna and is perpendicular to the straight line.

BRIEF DESCRIPTION OF THE DRAWINGS

DESCRIPTION OF THE PREFERRED EMBODIMENTS (A) FIG. 1 is a diagram depicting a difference of the paths of radio waves which come to two antennas according to the radio wave incoming direction. A direction connecting the positions of the two antennas ATR1 and ATR2 is defined as an antenna array direction.

Figure 1:
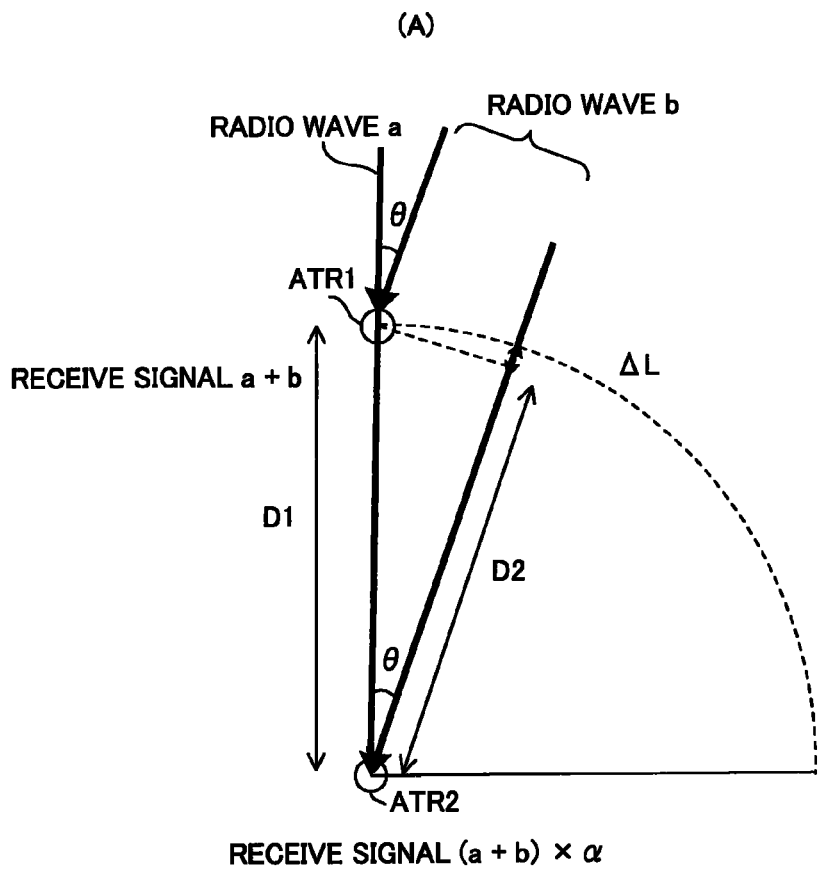
FIG. 1 are diagrams depicting the difference of the paths of radio waves which come to two antennas, according to the radio wave incoming direction.
Figure 1:
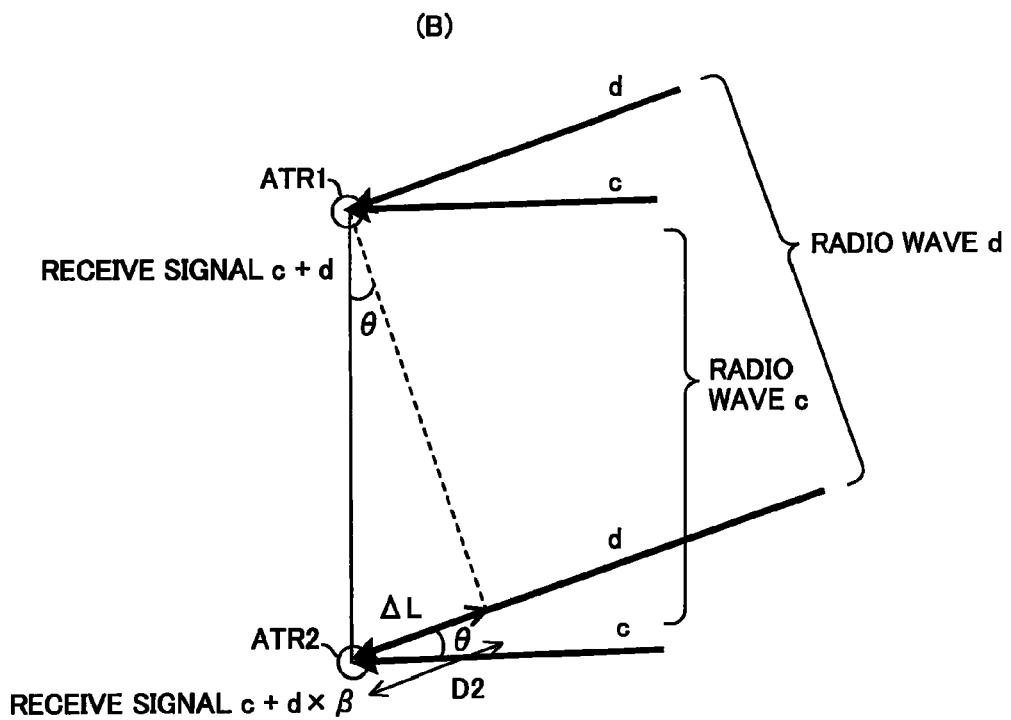

As (A) of FIG. 1 shows, if two radio waves a and b come at angle θ from the antenna array direction, a difference ΔL between the path difference D1 in a case where the radio wave a comes to the two antennas ATR1 and ATR2 and the path difference D2 in a case where radio wave b comes to the two antennas ATR1 and ATR2 is given by $$\Delta L = (D1 - D2) = L(1 - \cos\theta)$$

(where L is a length between the antennas)
and is small. If the receive signal at antenna ATR1 is (a+b), then the receive signal at antenna ATR2 is approximately (a+b)×α, that is, the correlation of the receive signals at antennas ATR1 and ATR2 is 1, which means that correlation is high. α here is a coefficient according to the distance propagation (phase difference) of the path length L.

On the other hand, if two radio waves c and d come in a direction perpendicular to the antenna array direction, as (B) of FIG. 1 shows, a difference ΔL between the path difference D1 (=0) when the radio wave c comes to the two antennas ATR1 and ATR2 and the path difference D2 when the radio wave d comes to the two antennas ATR1 and ATR2 is given by $$\Delta L = D2 = L \times \sin\theta$$

(where L is a length between the antennas)
and is large. If the receive signal at antenna ATR1 is (c+d), then the receive signal at antenna ATR2 is c+d×β, that is, the correlation of the receive signals at the antennas ATR1 and ATR2 is not 1, and correlation is low. β here is a coefficient according to the distance propagation (phase difference) of ΔL.

In other words, if the radio waves come in the antenna array direction, the change of path difference ΔL is small, compared with the case of the radio waves coming in a direction perpendicular to the antenna array direction, that is, if (a+b) is received by antenna ATR1, (a+b)×α is received by antenna ATR2. In this case, signals received by the two antennas are approximately the same, and the absolute value of the correlation of the antenna receive signals is 1. In this way, the correlation of radio waves coming from the antenna array direction, of which the change of the path difference ΔL is small, is higher than the that of the radio waves coming in a direction perpendicular to the antenna array directions.

Figure 2:
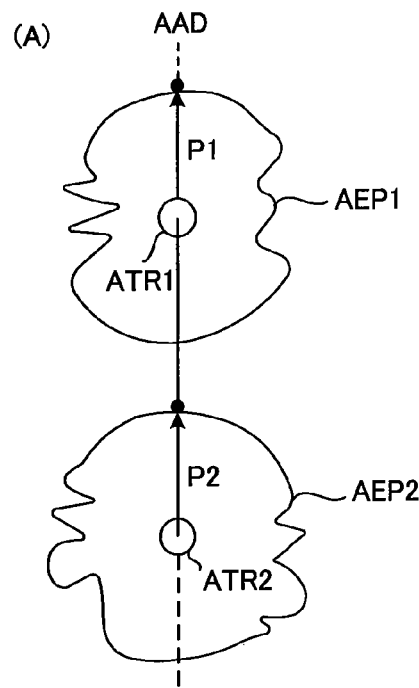
FIG. 2 are diagrams depicting the principle of the present invention.
Figure 2:
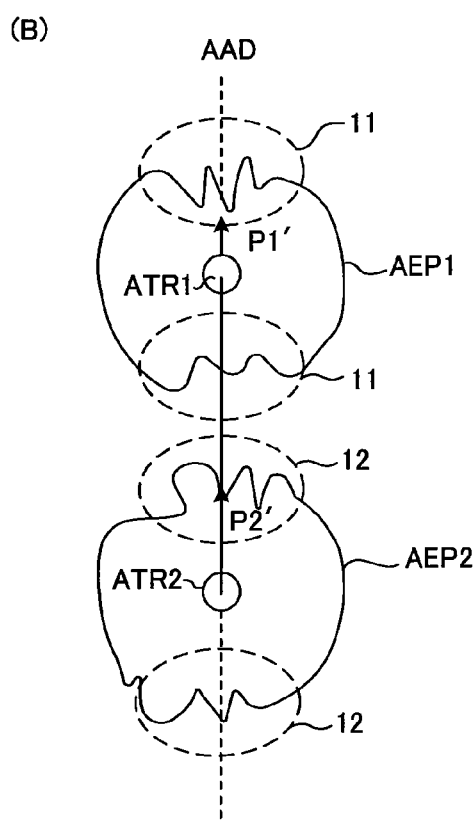

Therefore if the antenna radiation characteristic values P1 and P2 in the antenna array direction AAD of the two antennas ATR1 and ATR2 are the same, as shown in (A) of FIG. 2, the correlation between the antenna receive signals is not improved at all, but is still high. AEP1 and AEP2 are the antenna radiation patterns of the antennas ATR1 and ATR2.

On the other hand, if the antenna radiation characteristic values P1' and P2' in the antenna array direction ADD of the antennas ATR1 and ATR2 are different, as (B) of FIG. 2 shows, the correlation between the antenna receive signals is improved, and becomes low. In other words, in order to make the correlation in the antenna array direction low, a difference is created between the antenna radiation characteristics of the two antennas ATR1 and ATR2 in the antenna array direction. Therefore according to the present invention, the antennas ATR1 and ATR2 are positioned so that the direction ranges 11 and 12, in which fluctuation of the antenna radiation pattern characteristics AEP1 and AEP2 is large, are oriented in the antenna array direction AAD.

Figure 3:
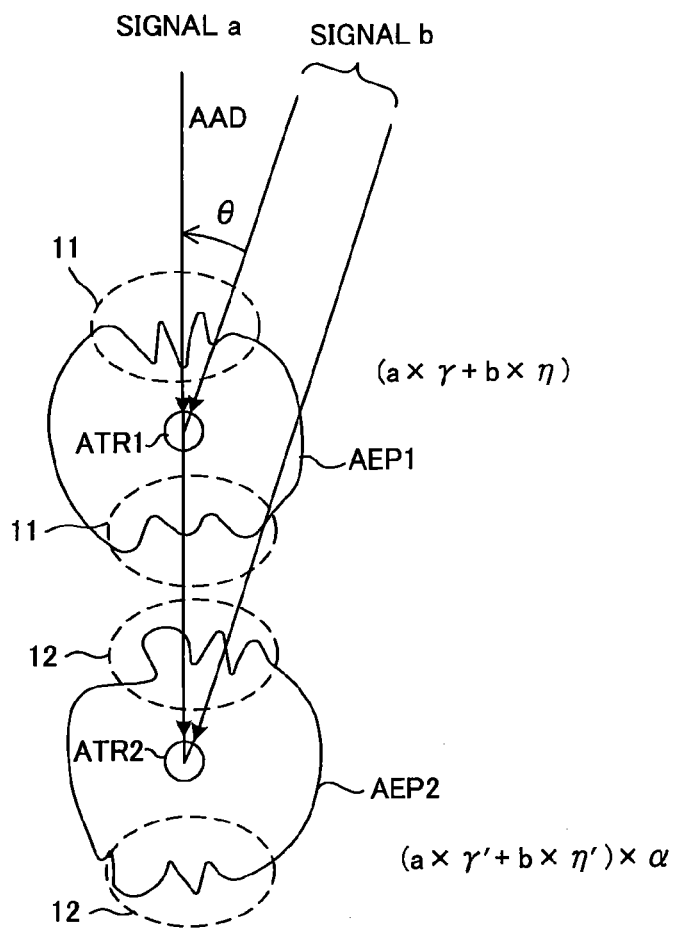
FIG. 3 is a diagram depicting the receive signals of antennas ATR1 and ATR2 when the antennas are positioned according to the present invention.

FIG. 3 is a diagram depicting the receive signals of the antennas ATR1 and ATR2 when the antennas ATR1 and ATR2 are positioned so that the directional ranges 11 and 12, in which the fluctuations of the antenna radiation pattern characteristics AEP1 and AEP2 is large, are oriented in the antenna array direction AAD, and two radio waves a and b come at angle θ from the antenna array direction AAD.

The receive signal of the antenna ATR1 becomes (a×γ+b×η), because of the influence of the radiation characteristic in the radiation range 11 of the antennas ATR1 and ATR2, and the receive signal of the antenna ATR2 becomes (a×γ'+b×η')×α, because of the influence of the radiation characteristics in the radiation ranges 11 and 12 of the antennas ATR1 and ATR2. As a result, the correlation between the receive signals of the two antennas ATR1 and ATR2 is improved, and becomes low.

Figure 4:
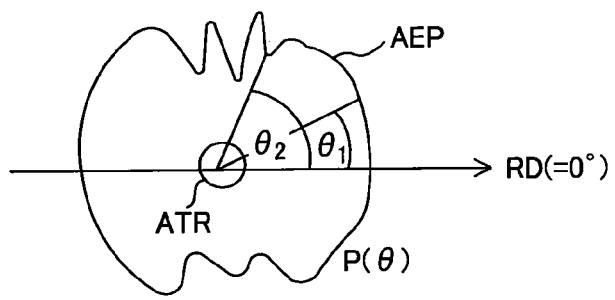
FIG. 4 is a diagram depicting a first direction decision processing for deciding a direction in which fluctuation is large in the antenna radiation pattern characteristics.

(B) Control to Decide the Direction in which the Fluctuation of the Antenna Radiation Pattern Characteristics is Large (a) First Direction Decision Processing FIG. 4 is a diagram depicting a first direction decision processing for deciding a direction in which fluctuation is large in the antenna radiation pattern characteristics. In the first direction decision processing, dispersion of the radiation pattern characteristics AEP, in a predetermined angle range $\theta_1$ to $\theta_2$ is calculated for the entire circumference in which a reference direction RD is 0° and a center direction of the angle range in which the dispersion is maximum is decided as the direction in which fluctuation is large in FIG. 3, so as to match this direction with the antenna array direction AAD. Specifically, the dispersion a of the radiation characteristics of the antenna in a predetermined angle range $\theta_1$ to $\theta_2$ is calculated by the following expression, $$\sigma = \frac{1}{\theta_2 - \theta_1} \int_{\theta_1}^{\theta_2} |p(\theta)|^2 d\theta - \left| \frac{1}{\theta_2 - \theta_1} \int_{\theta_1}^{\theta_2} p(\theta) d\theta \right|^2 \quad (1)$$

then the angle range $\theta_1$ to $\theta_2$ is changed for the entire 360° circumference, and the dispersion in each angle range is calculated by Expression (1). Here P(θ) is an antenna radiation characteristic value (complex number) at angle θ. Then the angle range in which the dispersion is maximum is determined, and the center direction in this angle range is decided as the antenna array direction, whereby correlation is decreased.

The center direction of the angle range in which the dispersion is maximum is determined by Expression (1) for the antennas ATR1 and ATR2 respectively, and this direction is decided as the antenna array direction.

(b) Second Direction Decision Processing

Figure 5:
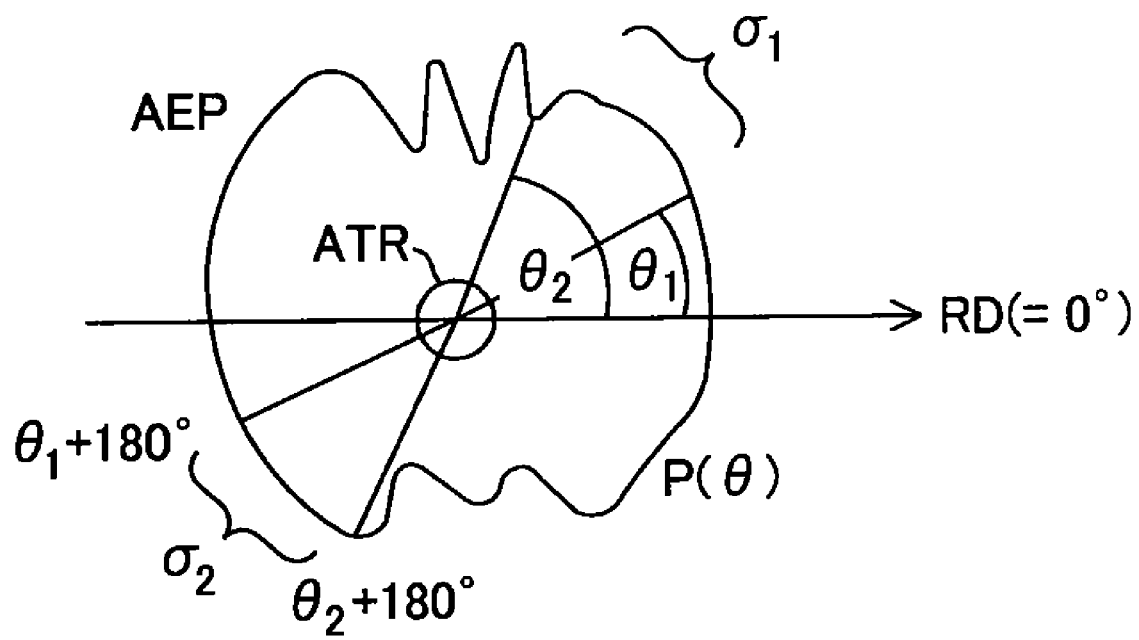
FIG. 5 is a diagram depicting a second direction decision processing for deciding a direction in which fluctuation is large in the antenna radiation pattern characteristics.

FIG. 5 is a diagram depicting a second direction decision processing for deciding a direction in which fluctuation is large in the antenna radiation pattern characteristics.

A total dispersion σ of a dispersion $\sigma_1$ of the radiation pattern characteristics AEP in a predetermined first angle range $\theta_1$ to $\theta_2$ and a dispersion $\sigma_2$ of the radiation pattern characteristics in a second angle range ($\theta_1$+180 to $\theta_2$+180), which is shifted from the first angle range by 180°, is calculated by the following expression, $$\sigma = \sigma_1 + \sigma_2 \quad (2)$$

$$= \frac{1}{\theta_2 - \theta_1} \int_{\theta_1}^{\theta_2} |p(\theta)|^2 d\theta - \left| \frac{1}{\theta_2 - \theta_1} \int_{\theta_1}^{\theta_2} p(\theta) d\theta \right|^2 +$$

-continued $$\frac{1}{\theta_2 - \theta_1} \int_{\theta_1+180}^{\theta_2+180} |p(\theta)|^2 d\theta - \left|\frac{1}{\theta_2 - \theta_1} \int_{\theta_1+180}^{\theta_2+180} p(\theta) d\theta\right|^2$$

then the angle range $\theta_1$ to $\theta_2$ is changed for the entire 360° circumference, and the dispersion in each angle range is calculated by Expression (2). Here $p(\theta)$ is an antenna radiation characteristic value (complex number) at angle $\theta$. Then the angle range in which the dispersion is maximum is determined, and the center direction in this angle range is determined as the antenna array direction, whereby the correlation is decreased.

The center direction of the angle range in which the dispersion is maximum is determined for the antennas ATR1 and ATR2 respectively by Expression (2), and this direction is decided as the antenna array direction.

(c) Third Direction Decision Processing

Figure 6:
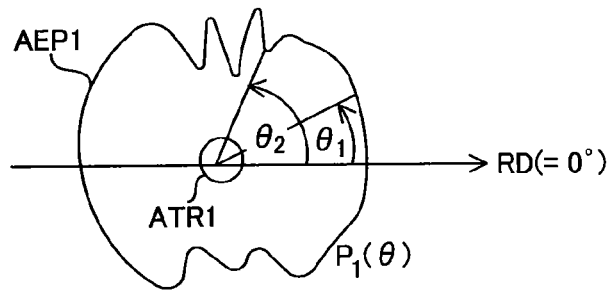
FIG. 6 is a diagram depicting a third direction decision processing for deciding a direction in which fluctuation is large in the antenna radiation pattern characteristics.
Figure 6:
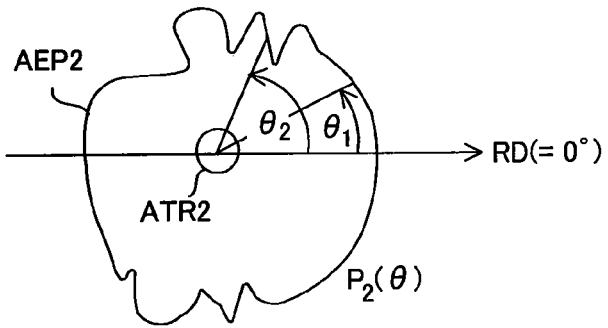
Figure 6:
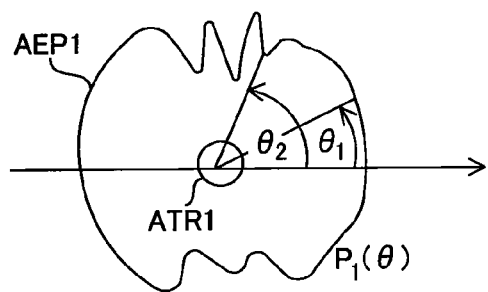
Figure 6:
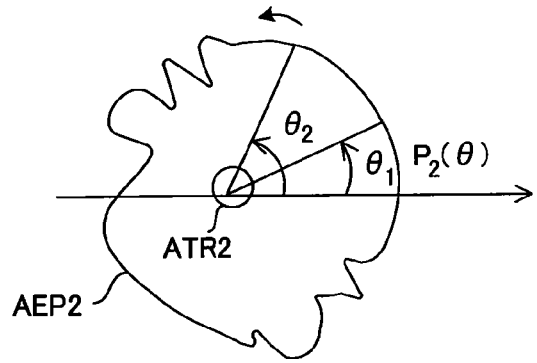

FIG. 6 is a diagram depicting a third direction decision processing for deciding a direction in which fluctuation is large in the antenna radiation pattern characteristics. In the first and second direction decision processings, an angle range in which the dispersion becomes maximum is decided individually for each antenna using Expression (1) or Expression (2), and the center direction thereof is decided as the direction in which fluctuation is large. In the third direction decision processing, however, the direction in which fluctuation is large is decided considering both of the radiation pattern characteristics, AEP1 and AEP2, of the two antennas ATR1 and ATR2 at the same time.

In other words, as (A) of FIG. 6 shows, a correlation $\lambda$ of radiation pattern characteristics AEP1 of the first antenna ATR1 in an angle range $\theta_1$ to $\theta_2$ and the radiation pattern characteristics AEP2 of the second antenna in the angle range $\theta_1$ to $\theta_2$ is calculated by the following expression.

$$\lambda = \left|\frac{1}{\theta_2 - \theta_1} \int_{\theta_1}^{\theta_2} p_1(\theta) \cdot p_2(\theta) d\theta\right| \qquad (3)$$

Here $p_1(\theta)$ and $p_2(\theta)$ are the antenna radiation characteristic values (complex numbers) at an angle $\theta$ of the first and second antennas respectively. Then in the state shown in (A) of FIG. 6, the angle range $\theta_1$ to $\theta_2$ of the first antenna ATR1 and the angle range $\theta_1$ to $\theta_2$ of the second antenna ATR2 are changed for the entire 360° circumference, by a predetermined angle each time, and the correlation in each angle range is calculated by Expression (3). If the correlation calculation is completed for the entire 360° circumference in the state shown in (A) of FIG. 6, the radiation pattern characteristics AEP2 of the second antenna is rotated for a predetermined angle, as shown in (B) of FIG. 6, and in this state shown in (B) of FIG. 6, the angle range $\theta_1$ to $\theta_2$ of the first antenna ATR1 and the angle range $\theta_1$ to $\theta_2$ of the second antenna ATR2 are changed for the entire 360° circumference by a predetermined angle each time, and the correlation in each angle range is calculated by Expression (3). Hereafter the same correlation calculation is performed by rotating the radiation pattern characteristics AEP2 of the second antenna by a predetermined angle each time, until rotated 360°.

While changing a combination of the angle range $\theta_1$ to $\theta_2$ of the first antenna and the angle range $\theta_1$ to $\theta_2$ of the second antenna, correlations of all the combinations are calculated by Expression (3). After the correlation calculation processing ends, a combination of the angle range of the first antenna and the angle range of the second antenna of which correlation is minimum is determined, and the center direction of the angle range of the first antenna of this combination is decided as the direction in which fluctuation is large of the first antenna, and the center direction of the angle range of the second antenna of this combination is decided as the direction in which fluctuation is large of the second antenna. And the correlation is decreased by coinciding the respective center direction with the antenna array direction AAD.

(d) Fourth Direction Decision Processing

Figure 7:
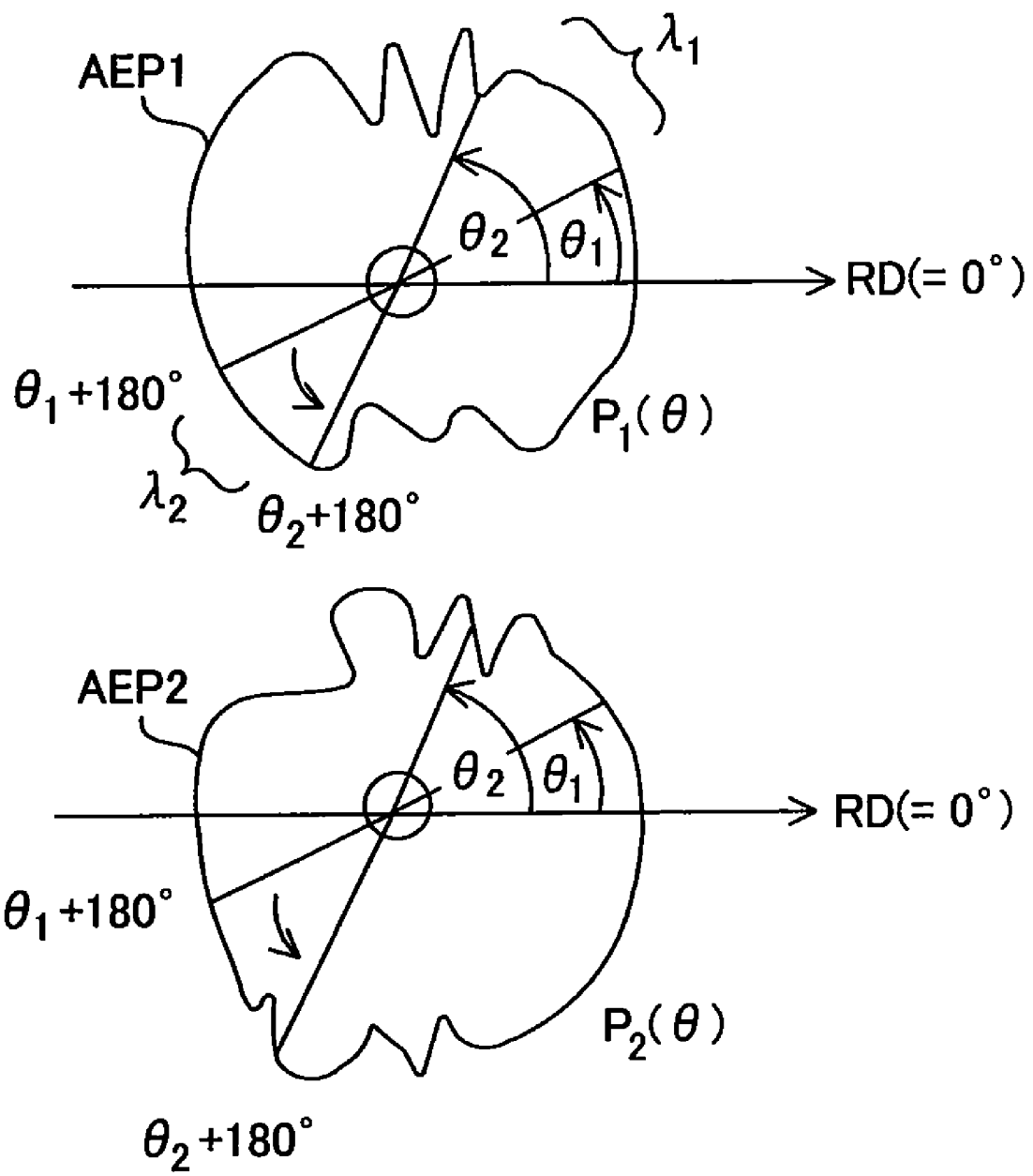
FIG. 7 is a diagram depicting a fourth direction decision processing for deciding a direction in which fluctuation is large in the antenna radiation pattern characteristics.

FIG. 7 is a diagram depicting a fourth direction decision processing for deciding a direction in which fluctuation is large in the antenna radiation pattern characteristics.

A total correlation $\lambda$ of a correlation $\lambda_1$ of the radiation pattern characteristics AEP1 and AEP in a first angle range $\theta_1$ to $\theta_2$ and a correlation $\lambda_2$ of the radiation pattern characteristics AEP1 and AEP2 in a second angle range ($\theta_1$+180 to $\theta_2$+180), which is 180° from the first angle range, is calculated by the following expression.

$$\lambda = \lambda_1 + \lambda_2 \qquad (4)$$

$$= \left|\frac{1}{\theta_2 + \theta_1} \int_{\theta_1}^{\theta_2} p_1(\theta) \cdot p_2(\theta) d\theta\right| + \left|\frac{1}{\theta_2 - \theta_1} \int_{\theta_1+180}^{\theta_2+180} p_1(\theta) \cdot p_2(\theta) d\theta\right|$$

Then a combination of the angle range $\theta_1$ to $\theta_2$ of the first antenna and the angle range $\theta_1$ to $\theta_2$ of the second antenna is changed in the same way as the third direction decision processing, and the correlations of all the combinations are calculated by Expression (4). After correlation calculation processing ends, a combination of the angle range of the first antenna and the angle range of the second antenna of which correlation is minimum is determined, and the center direction of the angle range of the first antenna of this combination is decided as the direction in which fluctuation is large of the first antenna, and the center direction of the angle range of the second antenna of this combination is decided as the direction in which fluctuation is large of the second antenna. And the correlation is decreased by coinciding the respective center direction with the antenna array direction AAD.

(C) Antenna Mounting Device

Figure 8:
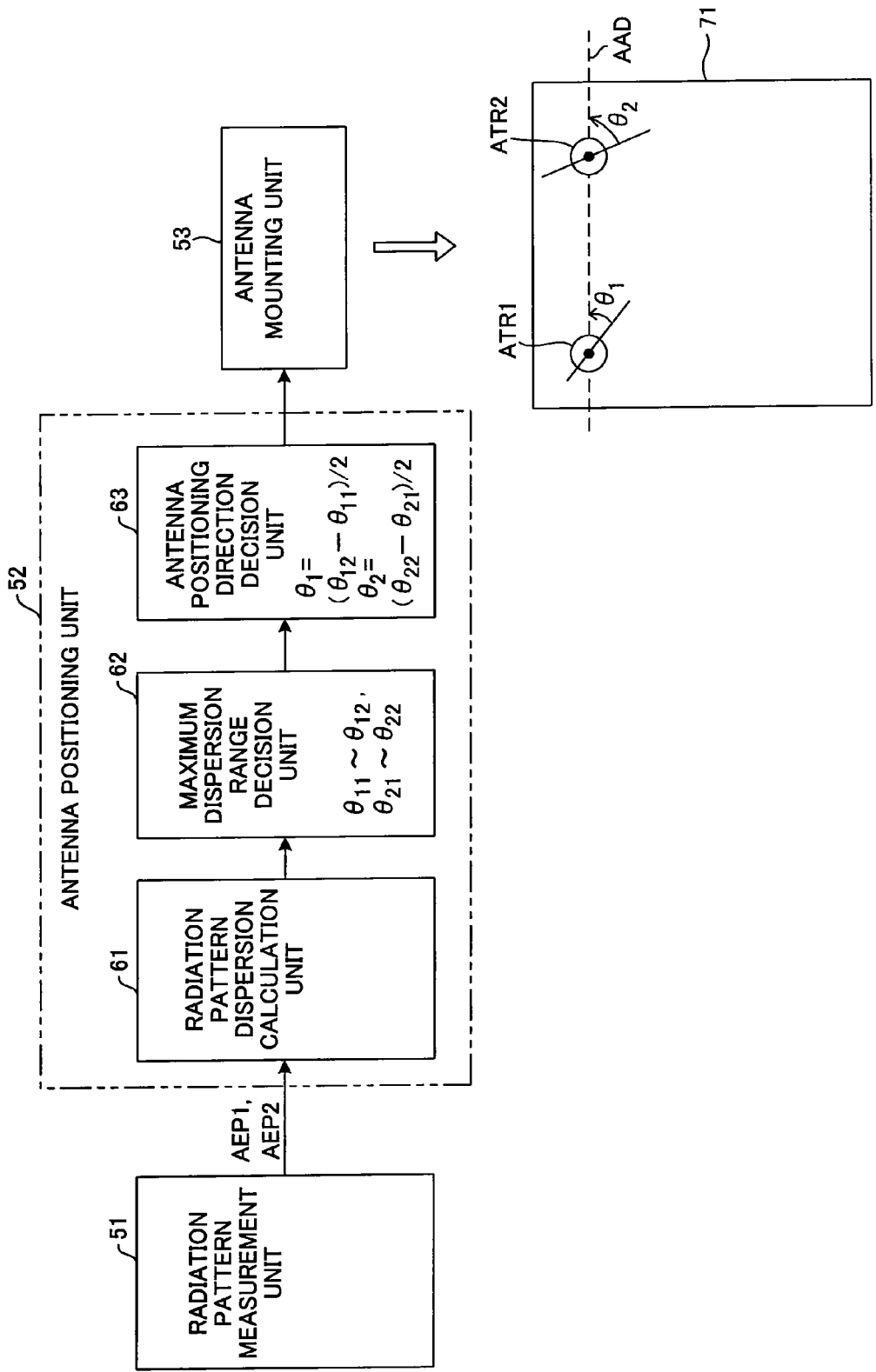
FIG. 8 is a block diagram depicting an antenna mounting device of the present invention.
Figure 9:
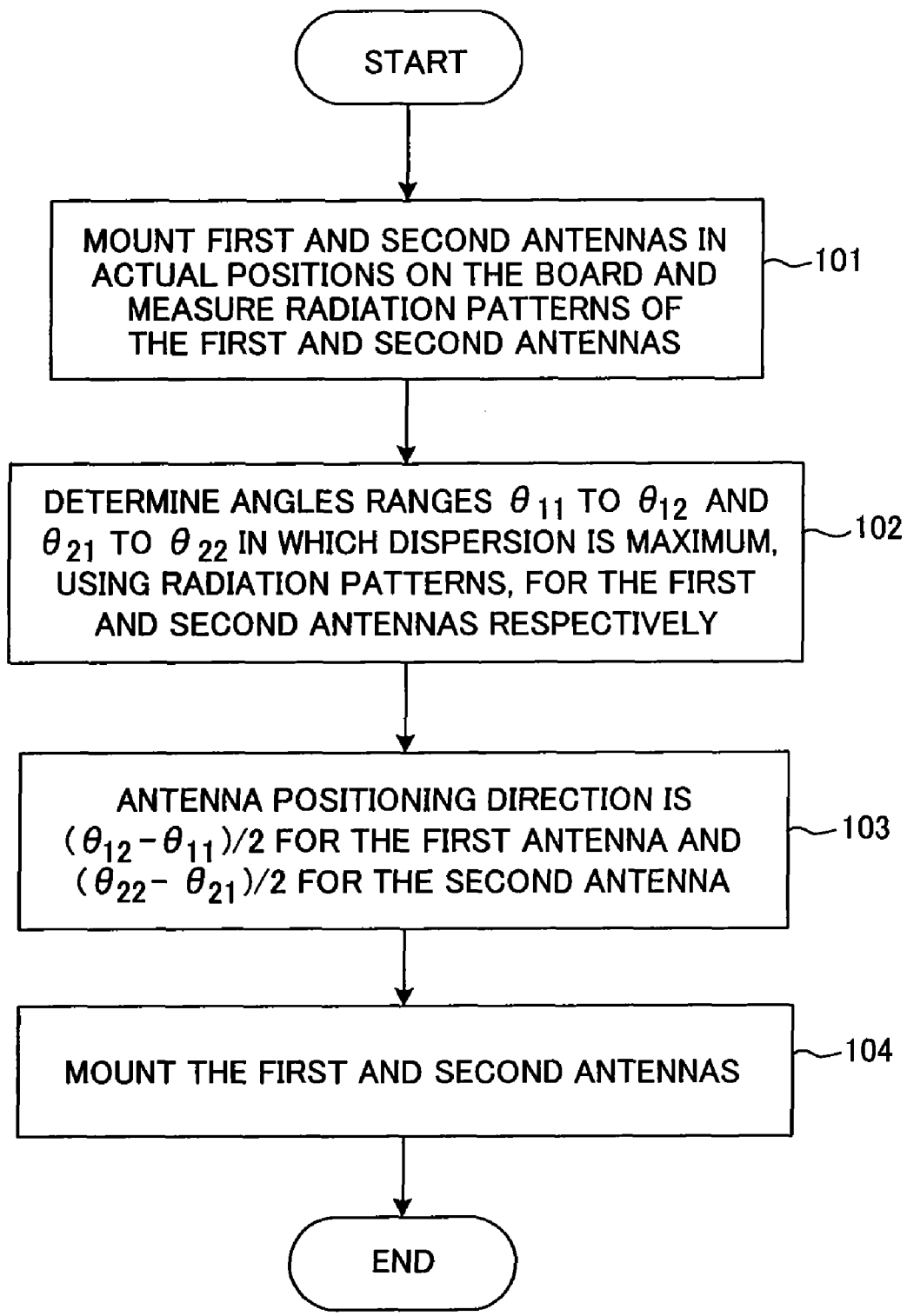
FIG. 9 is a flow chart depicting a processing of the antenna mounting device of the present invention.

FIG. 8 is a block diagram depicting an antenna mounting device of the present invention, and FIG. 9 is a flow chart depicting a processing of the antenna mounting device. It is assumed that the direction in which fluctuation is large is decided by the first direction decision processing.

A radiation pattern measurement unit 51 measures the radiation pattern characteristics AEP1 and AEP2 of the first and second antennas (e.g. patch antenna) ATR1 and ATR2 in a state where the two antennas are mounted in the antenna mounting positions of a portable telephone, for example, and inputs the measured radiation pattern characteristics to an antenna positioning unit 52 (step 101 in FIG. 9). A radiation pattern dispersion calculation unit 61 of the antenna positioning unit 52 shifts a predetermined angle range $\theta_1$ to $\theta_2$ for the entire 360° circumference for each antenna, and calculates the dispersion in each angle range by Expression (1). A maximum dispersion range decision unit 62 determines the angle ranges $\theta_{11}$ to $\theta_{12}$ and $\theta_{21}$ to $\theta_{22}$ of which dispersion is maximum, out of the dispersions calculated by the radiation pattern dispersion calculation unit 61, for each antenna, and inputs the angle ranges to an antenna positioning direction decision unit 63 (step 102). The antenna positioning direction decision unit 63 decides the center directions of the angle ranges $\theta_{11}$ to $\theta_{12}$ and $\theta_{21}$ to $\theta_{22}$ of each antenna which were input, that is, the directions of $\theta_1=(\theta_{12}-\theta_{11})/2$, $\theta_2=(\theta_{22}-\theta_{21})/2$ are decided as the antenna array directions of the two antennas ATR1 and ATR2, and are input to the antenna mounting unit 53 (step 103).

When the antennas ATR1 and ATR2 are mounted on a board 71 of a portable telephone, for example, an antenna mounting unit 53 mounts these antennas so that the angle $\theta_1$ and $\theta_2$, which were input from the antenna positioning direction decision unit 63 becomes the antenna array direction AAD (step 104).

In the above description, the angle $\theta_1$ and $\theta_2$ of the antennas ATR1 and ATR2, to coincide with the antenna array direction AAD, are calculated by Expression (1), but the angles $\theta_1$ and $\theta_2$ of the antennas ATR1 and ATR2, to coincide with the antenna array direction AAD, can also be calculated by Expressions (2) to (4).

The above example is the case of positioning two antennas, but the present invention can also be applied to the case of positioning three or more antennas.

In the above description, the case of receiving radio waves was described primarily, but the present invention can also be applied to the case of radiating radio waves.

(D) Antenna Device

In the antenna device of the present invention, two or more antennas are arrayed on a straight line. In FIG. 3, two antennas, that is, the first antenna ATR1 and the second antenna ATR2, are arrayed on the straight line. The antenna device of the present invention has the following features. The first antenna ATR1 and the second antenna ATR2 are positioned so that respective portions of each antenna having characteristics of which change is largest with respect to the change of an angle among the characteristics of the radiation pattern in the entire range of the circumference, are oriented in the antenna array direction AAD.

Figure 10:
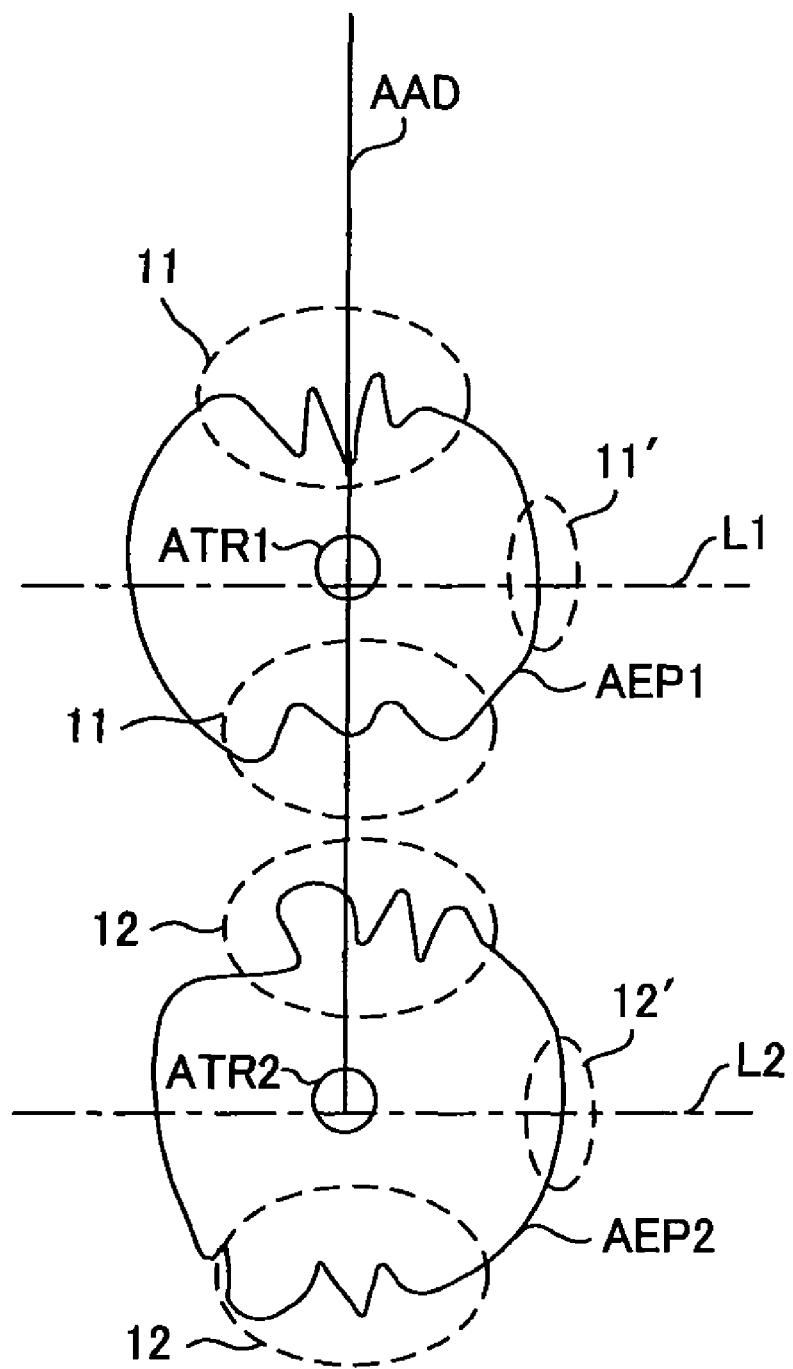
FIG. 10 is a diagram depicting an antenna device of the present invention.
Figure 11:
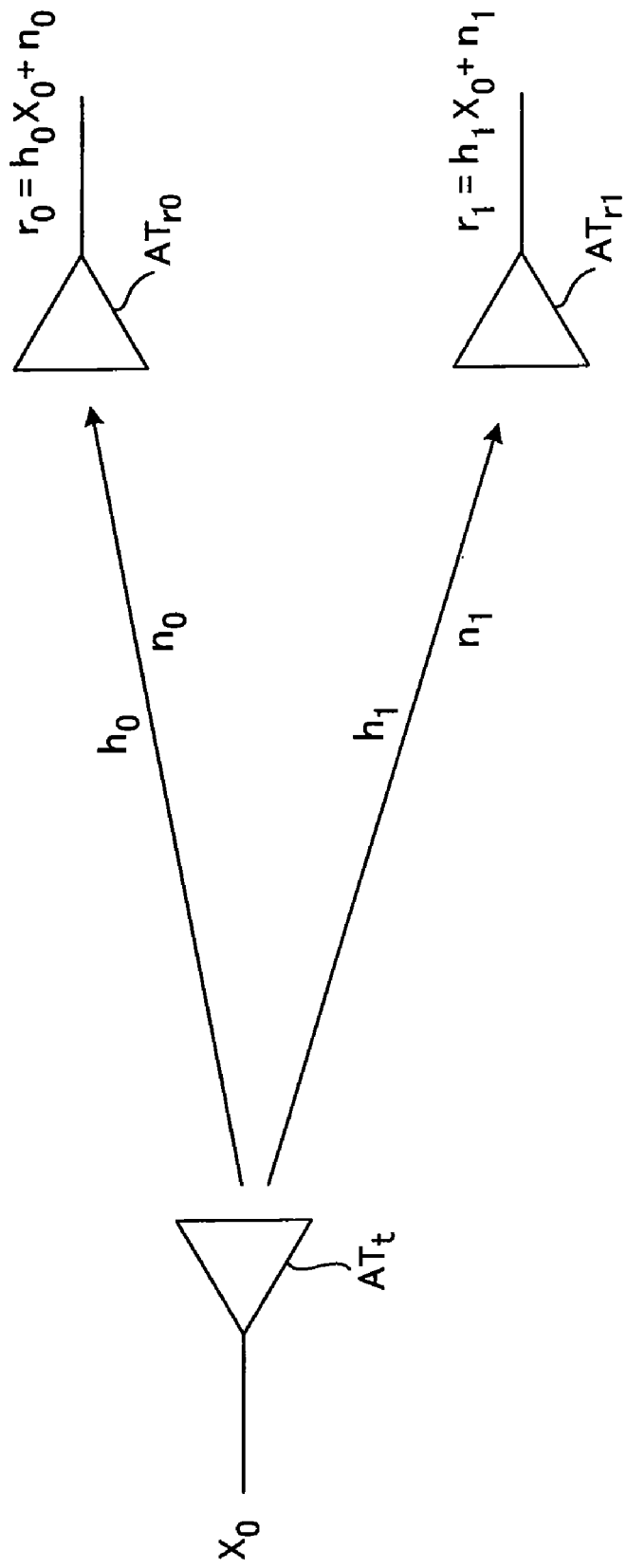
FIG. 11 is a diagram depicting receive diversity.
Figure 12:
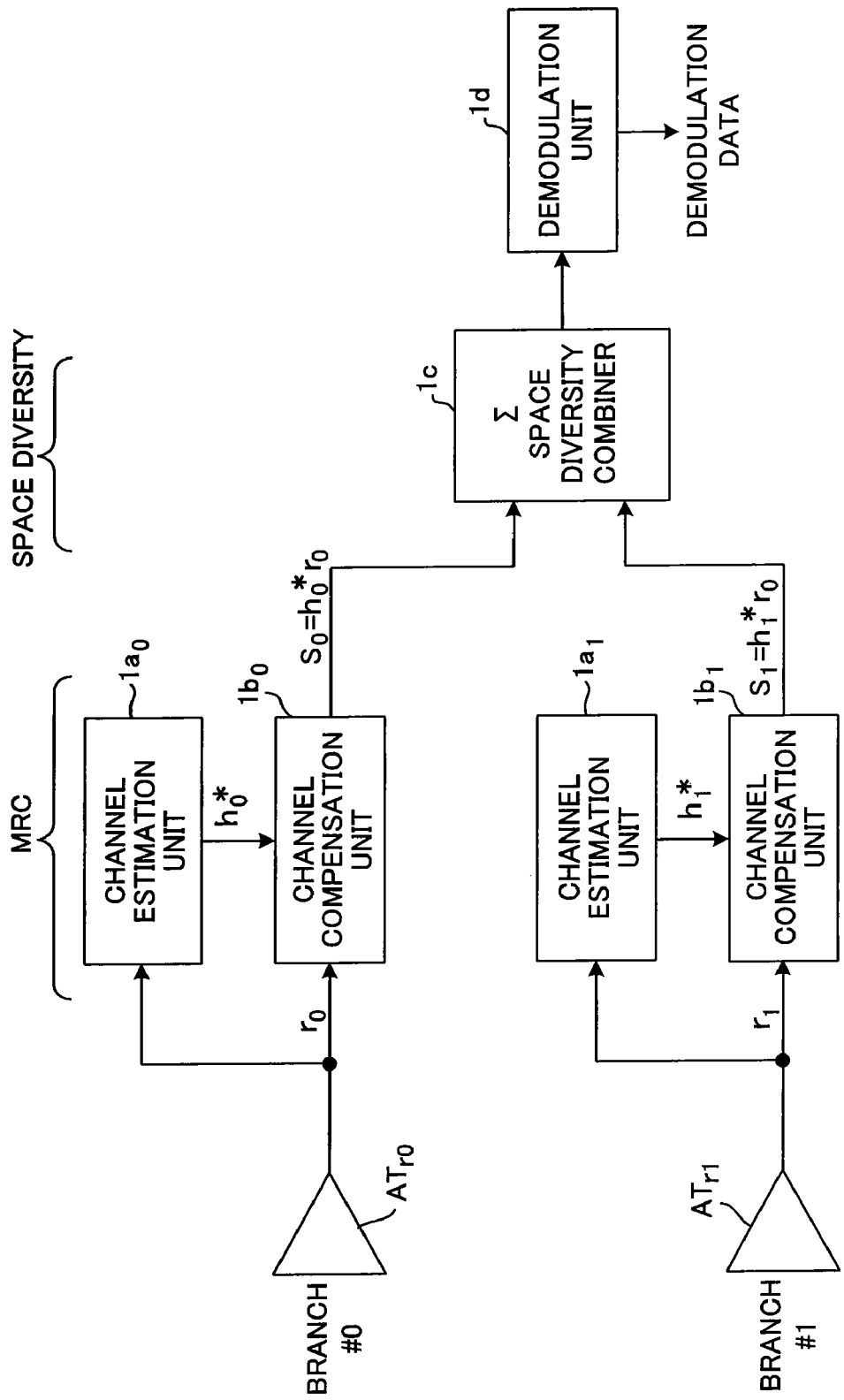
FIG. 12 is a diagram depicting maximum ratio combining.
Figure 13:
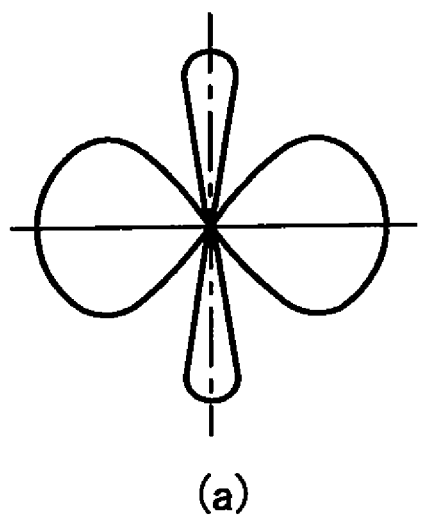
FIG. 13 are diagrams depicting a prior art.
Figure 13:
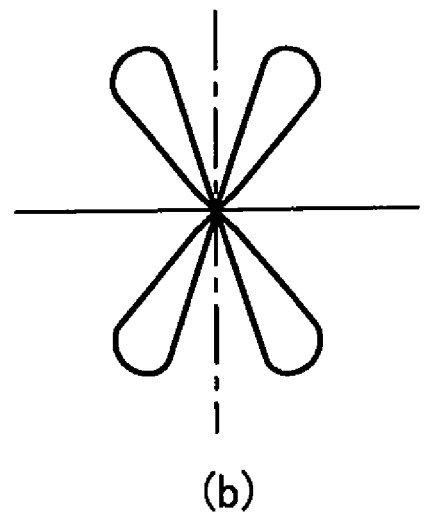

FIG. 10 is another diagram depicting the antenna device of the present invention. In this antenna device, the first antenna ATR1 and the second antenna ATR2 are arrayed on the straight line, just like FIG. 3. The first antenna ATR1 is positioned so that the characteristics 11 of a portion where the radiation pattern AEP1 of the first antenna crosses the straight line AAD has a larger change than a change of the characteristics 11' of a portion where the radiation pattern AEP1 crosses a straight line L1 which passes through the center of the antenna and is perpendicular to the straight line AAD.

The second antenna ATR2 is positioned so that the characteristics 12 of a portion where the radiation pattern AEP2 of the second antenna crosses the straight line AAD has a larger change than the characteristics 12' of a portion where the radiation pattern AEP2 crosses a straight line L2 which passes through the center of the antenna and is perpendicular to the straight line AAD.

EFFECT OF THE INVENTION

According to the present invention, correlation between antenna receive signals can be decreased regardless the radio wave incoming direction, and as a result, a diversity effect can be implemented.

Also according to the present invention, correlation between antenna receive signals can be decreased even if the radio waves come in a direction of the straight line connecting at least two antenna positions (antenna array direction).

What is claimed is:

1. An antenna positioning method for a communication device that performs communication using a plurality of antennas positioned on a straight line, comprising:

measuring radiation pattern characteristics of each antenna;

detecting a direction in which fluctuation in the amplitude of the radiation pattern characteristics of each antenna is large; and in order to make a correlation of receive signals at the antennas small, positioning each antenna in the communication device so that the direction in which said characteristic fluctuation is large coincides with the straight line direction.

2. The antenna positioning method according to claim 1, wherein said detecting comprises:

calculating a dispersion of the radiation pattern characteristics in a predetermined angle range for the entire circumference; and deciding a center direction of the angle range in which said calculated dispersion is maximum, as the direction in which said characteristic fluctuation is large.

3. The antenna positioning method according to claim 1, wherein said detecting comprises:

calculating a total of a dispersion of the radiation pattern characteristics in a predetermined first angle range and a dispersion of the radiation pattern characteristics in a second angle range, which is shifted from said first angle range by 180°, for the entire circumference; and deciding a center direction of the first angle range in which said calculated total is maximum, as the direction in which said characteristic fluctuation is large.

4. The antenna positioning method according to claim 1, wherein said detecting comprises:

calculating correlation of the radiation pattern characteristics of a first antenna in a first angle range and the radiation pattern characteristics of a second antenna in a second angle range, while changing a combination of said first angle range and said second angle range; and determining a combination of the first angle range and the second angle range of which correlation is minimum, and judging a center direction of said first angle range as the direction in which said characteristic fluctuation of the first antenna is large, and judging a center direction of said second angle range as the direction in which said characteristic fluctuation of the second antenna is large.

5. The antenna positioning method according to claim 1, wherein said detecting comprises:

calculating correlation of the radiation pattern characteristics of a first antenna in a first angle range and an angle range shifted from said first angle range by 180° and the radiation pattern characteristics of a second antenna in a second angle range and an angle range shifted from said second angle range by 180°, while changing a combination of said first angle range and said second angle range; and determining a combination of the first angle range and second angle range of which correlation is minimum, and judging a center direction of said first angle range as the direction in which said characteristic fluctuation of the first antenna is large, and judging a center direction of said second angle range as the direction in which said characteristic fluctuation of the second antenna is large.

6. An antenna mounting device for a communication device that performs communication using a plurality of antennas positioned on a straight line, comprising:

a radiation pattern characteristic measurement unit that measures radiation pattern characteristics of each antenna;

a characteristic fluctuation detection unit that detects a direction in which fluctuation in the amplitude of the radiation pattern characteristics of each antenna is large; and an antenna positioning unit that positions each antenna in the communication device so that the direction in which said characteristic fluctuation is large coincides with the straight line direction.

7. The antenna mounting device according to claim 6, wherein said characteristic fluctuation detection unit calculates a dispersion of the radiation pattern characteristics in a predetermined angle range for the entire circumference for each antenna, and decides a center direction of the angle range in which said calculated dispersion is maximum, as the direction in which said characteristic fluctuation is large.

8. The antenna mounting device according to claim 6, wherein said characteristic fluctuation detection unit calculates a total of a dispersion of the radiation pattern characteristics in a predetermined first angle range, and a dispersion of the radiation pattern characteristics in a second angle range which is shifted from said first angle range by 180°, for the entire circumference for each antenna, and decides a center direction of the first angle range in which said calculated total is maximum, as the direction in which said characteristic fluctuation is large.

9. The antenna mounting device according to claim 6, wherein said characteristic fluctuation detection unit calculates correlation of the radiation pattern characteristics of a first antenna in a first angle range and the radiation pattern characteristics of a second antenna in a second angle range, while changing a combination of said first angle range and said second angle range, determines a combination of the first angle range and the second angle range of which correlation is minimum, and judges a center direction of said first angle range as the direction in which said characteristic fluctuation of the first antenna is large, and judges a center direction of said second angle range as the direction in which said characteristic fluctuation of the second antenna is large.

10. The antenna mounting device according to claim 6, wherein said characteristic fluctuation detection unit calculates correlation of the radiation pattern characteristics of a first antenna in a first angle range and an angle range shifted from said first angle range by 180° and the radiation pattern characteristics of a second antenna in a second angle range and an angle range shifted from said second angle range by 180°, while changing a combination of said first angle range and said second angle range, determines a combination of the first angle range and the second angle range of which correlation is minimum, and judges a center direction of said first angle range as the direction in which said characteristic fluctuation of the first antenna is large, and judges a center direction of said second angle range as the direction in which said characteristic fluctuation of the second antenna is large.

11. An antenna device in which a plurality of antennas, including a first antenna and a second antenna, are positioned on a straight line, wherein
said first antenna is positioned so that radiation pattern characteristics of said first antenna at a portion crossing with said straight line has a larger change in the amplitude than a change of the radiation pattern characteristics of said first antenna at a portion crossing with a line which passes through the center of said first antenna and is perpendicular to said straight line, and wherein
said second antenna is positioned so that radiation pattern characteristics of said second antenna at a portion crossing with said straight line has a larger change in the amplitude than a change of the radiation pattern characteristics of said second antenna at a portion crossing with a line which passes through the center of said second antenna and is perpendicular to said straight line.

12. An antenna device in which a plurality of antennas, including a first antenna and a second antenna, are positioned on a straight line, wherein in order to make a correlation of receive signals at the antennas small, said first antenna and said second antenna are positioned so that respective portions of each antenna having characteristics of which change in the amplitude is largest with respect to the change of an angle among the characteristics of radiation pattern in the entire range of the circumference are oriented in the direction of said straight line.

* * * * *